(12) United States Patent  
Bassirat et al.

(10) Patent No.: US 12,501,458 B2  
(45) Date of Patent: *Dec. 16, 2025

(54) MULTIPLE CONCURRENT BANDWIDTH PARTS FOR A BASE STATION OF A CELLULAR NETWORK

(71) Applicant: DISH Wireless L.L.C., Englewood, CO (US)

(72) Inventors: Farhad Bassirat, Arlington, VA (US); Mariam Sorond, Reston, VA (US); Siddhartha Chenumolu, Reston, VA (US); Mehdi Alasti, Reston, VA (US)

(73) Assignee: DISH Wireless L.L.C., Littleton, CO (US)

( * ) Notice: Subject to any disclaimer, the term of this patent is extended or adjusted under 35 U.S.C. 154(b) by 662 days.

This patent is subject to a terminal disclaimer.

(21) Appl. No.: 17/443,866

(22) Filed: Jul. 28, 2021

(65) Prior Publication Data

US 2021/0360613 A1 Nov. 18, 2021

Related U.S. Application Data

(63) Continuation of application No. 16/518,863, filed on Jul. 22, 2019, now Pat. No. 11,109,382.

(51) Int. Cl.
*H04W 72/02* (2009.01)
*H04B 17/318* (2015.01)
*H04W 72/51* (2023.01)

(52) U.S. Cl.
CPC .......... *H04W 72/51* (2023.01); *H04B 17/318* (2015.01)

(58) Field of Classification Search
CPC ................................................ H04W 72/048
See application file for complete search history.

(56) References Cited

U.S. PATENT DOCUMENTS 10,932,269 B2 2/2021 Bassirat et al.
11,109,382 B2 8/2021 Bassirat et al.
(Continued)

FOREIGN PATENT DOCUMENTS

EP 3478019 5/2019
JP 2012212956 A 11/2012
(Continued)

OTHER PUBLICATIONS

International Search Report and Written Opinion for PCT/US2020/042276 mailed Sep. 11, 2020, all pages.
(Continued)

*Primary Examiner* — Bo Hui A Zhu
(74) *Attorney, Agent, or Firm* — Kilpatrick Townsend & Stockton LLP

(57) ABSTRACT

Various arrangements for improving cell coverage are presented. A cellular network can define a first bandwidth part and a second bandwidth part to be implemented concurrently by a base station of the cellular network. The first bandwidth part and the second bandwidth part do not overlap and may be separated by a guard band. The first bandwidth part can have a greater bandwidth and greater sub-carrier spacing than the second bandwidth part. The cellular network can determine a first set of user equipment to use the first bandwidth part for communication with the base station and a second set of user equipment to use the second bandwidth part for communication with the base station. Communication with the first set of user equipment using the first bandwidth part and the second set of user equipment using the second bandwidth part may be performed.

20 Claims, 7 Drawing Sheets

(56) References Cited

U.S. PATENT DOCUMENTS

| | | |
|---|---|---|
| 2019/0044689 A1 | 2/2019 | Yiu et al. |
| 2019/0104543 A1 | 4/2019 | Park |
| 2019/0132110 A1 | 5/2019 | Zhou et al. |
| 2019/0141734 A1 | 5/2019 | Lei et al. |
| 2019/0150172 A1 | 5/2019 | Ang et al. |
| 2019/0182000 A1 | 6/2019 | Futaki |
| 2019/0207667 A1 | 7/2019 | Zhou et al. |
| 2019/0215136 A1 | 7/2019 | Zhou et al. |
| 2019/0260447 A1 | 8/2019 | Nam et al. |
| 2019/0261405 A1 | 8/2019 | Ang et al. |
| 2019/0274162 A1 | 9/2019 | Zhang et al. |
| 2019/0306841 A1 | 10/2019 | Huang et al. |
| 2019/0313332 A1 | 10/2019 | Wu et al. |
| 2019/0313410 A1 | 10/2019 | Yang et al. |
| 2019/0357300 A1 | 11/2019 | Zhou et al. |
| 2019/0393969 A1 | 12/2019 | Kim |
| 2019/0394082 A1 | 12/2019 | Cirik et al. |
| 2020/0059345 A1 | 2/2020 | Pelletier et al. |
| 2020/0077432 A1 | 3/2020 | Xiong et al. |
| 2020/0120642 A1 | 4/2020 | Hwang et al. |
| 2020/0178252 A1 | 6/2020 | Li et al. |
| 2020/0213060 A1 | 7/2020 | Li et al. |
| 2020/0214015 A1 | 7/2020 | Zhou |
| 2021/0266920 A1* | 8/2021 | Yan .................. H04W 72/0453 |

FOREIGN PATENT DOCUMENTS

| | | |
|---|---|---|
| WO | 2019/030335 A1 | 2/2019 |
| WO | 2019029366 | 2/2019 |
| WO | 2019/062658 A1 | 4/2019 |
| WO | 2019061145 | 4/2019 |

OTHER PUBLICATIONS

International Search Report and Written Opinion for PCT/US2020/042547 mailed Oct. 1, 2020, all pages.

Huawei et al., "On bandwidth part and bandwidth adaptation," 3GPP Draft; R1-1706900, $3^{rd}$ Generation Partnership Project, Mobile Competence Centre; 650, Route Des Lucioles; F-06921 Sophia-Antipolis Cedex; France, vol. RAN WG1, No. Hangzhou, China; May 15, 2017-May 19, 2017 May 6, 2017, XP051261558, Retrieved from the Internet: URL:http://www.3gpp.org/ftp/tsg_ran/WG1_RL1/TSGR1_89/Docs/ [retrieved on May 6, 2017] p. 4-p. 6; figures 3-5.

Schaich Frank et al., "Subcarrier Spacing—How to Make Use of This Degree of Freedom," 2016 IEEE $83^{rd}$ Vehicular Technology Conference (VTC Spring), IEEE, May 15, 2016, pp. 1-16, XP032918731, DOI: 10.1109/VTCSPRING.2016.7504496 [retrieved on Jul. 5, 2016] the whole document.

"Resource Allocation for Wideband Operation", 3Generation Partnership Project Technical Specification Group Radio Access Network Working Group1 NR Ad-Hoc#2, R1-1710126, Jun. 27-30, 2017, 6 pages.

* cited by examiner

MULTIPLE CONCURRENT BANDWIDTH PARTS FOR A BASE STATION OF A CELLULAR NETWORK

CROSS-REFERENCES TO RELATED APPLICATIONS

This application is a continuation of U.S. patent application Ser. No. 16/518,863, filed Jul. 22, 2019, entitled "Multiple Concurrent Bandwidth Parts for a Base Station of a Cellular Network," the entire disclosure of which is hereby incorporated by reference for all purposes.

U.S. patent application Ser. No. 16/518,863 is related to U.S. patent application Ser. No. 16/518,866, filed Jul. 22, 2019, entitled "Bandwidth Adjustment of Multiple Concurrent Bandwidth Parts for a Base Station of a Cellular Network," the entire disclosure of which is hereby incorporated by reference for all purposes.

BACKGROUND

A 5G cellular network base station can support multiple sub-carrier spacings (SCSs). While a higher SCS can have certain advantages, such as low latency, a lower SCS can have other advantages, such as the base station being able to provide coverage to a greater region. Additionally, battery life of the UE may be improved by less bandwidth and lower SCS being used for communication between the UE and base station. Conventionally, when a single bandwidth part (BWP) is used for communication with UE, these factors may be weighed against each other to determine a compromise configuration.

SUMMARY

Various embodiments are described related to a method for improving cell coverage. In some embodiments, a method for improving cell coverage is described. The method may comprise defining, by a cellular network, a first bandwidth part and a second bandwidth part to be implemented concurrently by a base station of the cellular network. The first bandwidth part and the second bandwidth part may not overlap and may be separated by a guard band. The first bandwidth part may have a wider bandwidth than the second bandwidth part. The first bandwidth part may have greater subcarrier spacing (SCS) than the second bandwidth part. The method may include determining, by the cellular network, a first set of user equipment to use the first bandwidth part for communication with the base station and a second set of user equipment to use the second bandwidth part for communication with the base station. The first set of user equipment may be distinct from the second set of user equipment. The method may comprise performing, by the base station, communication with the first set of user equipment using the first bandwidth part and the second set of user equipment using the second bandwidth part.

Embodiments of such a method may include one or more of the following features: measuring, by a user equipment, a signal strength of a signal received from the base station and providing, by the user equipment, an indication of the signal strength to the base station. Determining, by the cellular network, the first set of user equipment to use the first bandwidth part for communication with the base station and the second set of user equipment to use the second bandwidth part for communication with the base station may comprise, for the user equipment, selecting the first bandwidth part or the second bandwidth part based on the indication of the signal strength. Selecting the first bandwidth part or the second bandwidth part based on the indication of the signal strength may further comprise comparing the indication of the signal strength to a predefined threshold signal strength. The first bandwidth part may be selected in response to the indication of the signal strength being greater than the predefined threshold signal strength. The second bandwidth part may be selected in response to the indication of the signal strength being less than the predefined threshold signal strength. The cellular network may use 5G New Radio (NR) radio access technology (RAT). The method may further comprise monitoring, by the cellular network, bandwidth usage within the first bandwidth part and the second bandwidth part and reallocating, by the cellular network, a relative amount of bandwidth within the first bandwidth part and the second bandwidth part based on the monitored bandwidth usage. The first set of user equipment communicating with the base station using the first bandwidth part may experience lower latency than the second set of user equipment communicating with the base station using the second bandwidth part. The second bandwidth part may provide coverage over a greater geographical area than the first bandwidth part.

In some embodiments, a cellular communication system is described. The system may comprise a base station functioning as part of a cellular network that communicates with a plurality of user equipment. The base station may be configured to define a first bandwidth part and a second bandwidth part to be implemented concurrently by the base station of the cellular network. The first bandwidth part and the second bandwidth part may not overlap and may be separated by a guard band. The first bandwidth part may have a wider bandwidth than the second bandwidth part. The first bandwidth part may have greater subcarrier spacing (SCS) than the second bandwidth part. The base station may be configured to determine a first set of user equipment of the plurality of user equipment to use the first bandwidth part for communication with the base station and a second set of user equipment of the plurality of user equipment to use the second bandwidth part for communication with the base station. The first set of user equipment may be distinct from the second set of user equipment. The base station may be configured to perform communication with the first set of user equipment using the first bandwidth part and the second set of user equipment using the second bandwidth part.

Embodiments of such a system may include one or more of the following features: the system may further comprise the plurality of user equipment. A piece of user equipment of the plurality of user equipment may be configured to measure a signal strength of a signal received from the base station and provide an indication of the signal strength to the base station. The base station may be configured to determine the first set of user equipment to use the first bandwidth part for communication with the base station and the second set of user equipment to use the second bandwidth part for communication with the base station may comprise the base station being configured to, for the user equipment instance, select the first bandwidth part or the second bandwidth part based on the indication of the signal strength. The base station being configured to select the first bandwidth part or the second bandwidth part based on the indication of the signal strength may further comprise the base station being configured to compare the indication of the signal strength to a predefined threshold signal strength. The first bandwidth part may be selected in response to the indication of the signal strength being greater than the predefined threshold signal strength. The second bandwidth part may be selected in response to the indication of the signal strength being less than the predefined threshold signal strength. The cellular network may use 5G New Radio (NR) radio access technology (RAT) and the base station may be a gNodeB (gNB). The base station may be further configured to monitor bandwidth usage within the first bandwidth part and the second bandwidth part and reallocate a relative amount of bandwidth within the first bandwidth part and the second bandwidth part based on the monitored bandwidth usage. The system may further comprise the plurality of user equipment. The first set of user equipment communicating with the base station using the first bandwidth part may experience lower latency than the second set of user equipment communicating with the base station using the second bandwidth part. The second bandwidth part may provide coverage over a greater geographical area than the first bandwidth part.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A base station can be configured to divide available channel bandwidth for communication by the base station (BS) into multiple bandwidth parts that are used by the BS concurrently for communication with different pieces of user equipment (UE). For UE located relatively close to the BS (e.g., that receive a high level of signal strength from the BS), the UE may be assigned to use a first bandwidth part (BWP). The first BWP may have a greater bandwidth than a second BWP. The first BWP may have higher subcarrier spacing and, thus, latency may be decreased. For UE located relatively far from the BS (e.g., that receive a relatively low level of signal strength from the BS), the UE may be assigned to use a second BWP. The second BWP may have a lower bandwidth than the first BWP. The second BWP may have lower subcarrier spacing and, thus, latency may be greater than when the first BWP is used; however, the second BWP can have a smaller bandwidth than the first BWP. By virtue of the bandwidth of the second BWP having a smaller bandwidth, resulting in smaller search part for UE, the power usage at the UE to search for its scheduled data in the receive band and for transmitting to BS may be decreased (and, thus, battery life may be increased).

When network traffic using a particular BWP increases above a defined threshold, the BWP on which high traffic is being detected by the base station may have its bandwidth increased by the base station. The other BWP may have its bandwidth decreased by the base station, thus more dynamically allocating bandwidth based on the amount of traffic. In some embodiments, each UE may be provided with up to four BWP definitions. Of the up to four BWP definitions, only one BWP definition is used by a UE at a given time. When a base station determines to transition from using first and second BWP definitions to third and fourth BWP definitions, the transition may involve first transitioning the BWP that is to be decreased in bandwidth. Once all relevant UE are using the BWP definition that is smaller in bandwidth, the other BWP definition may be transitioned to the BWP that uses the BWP greater in bandwidth. Further definition regarding such transitions is provided in relation to FIGS. 6 and 7.

Figure 1:
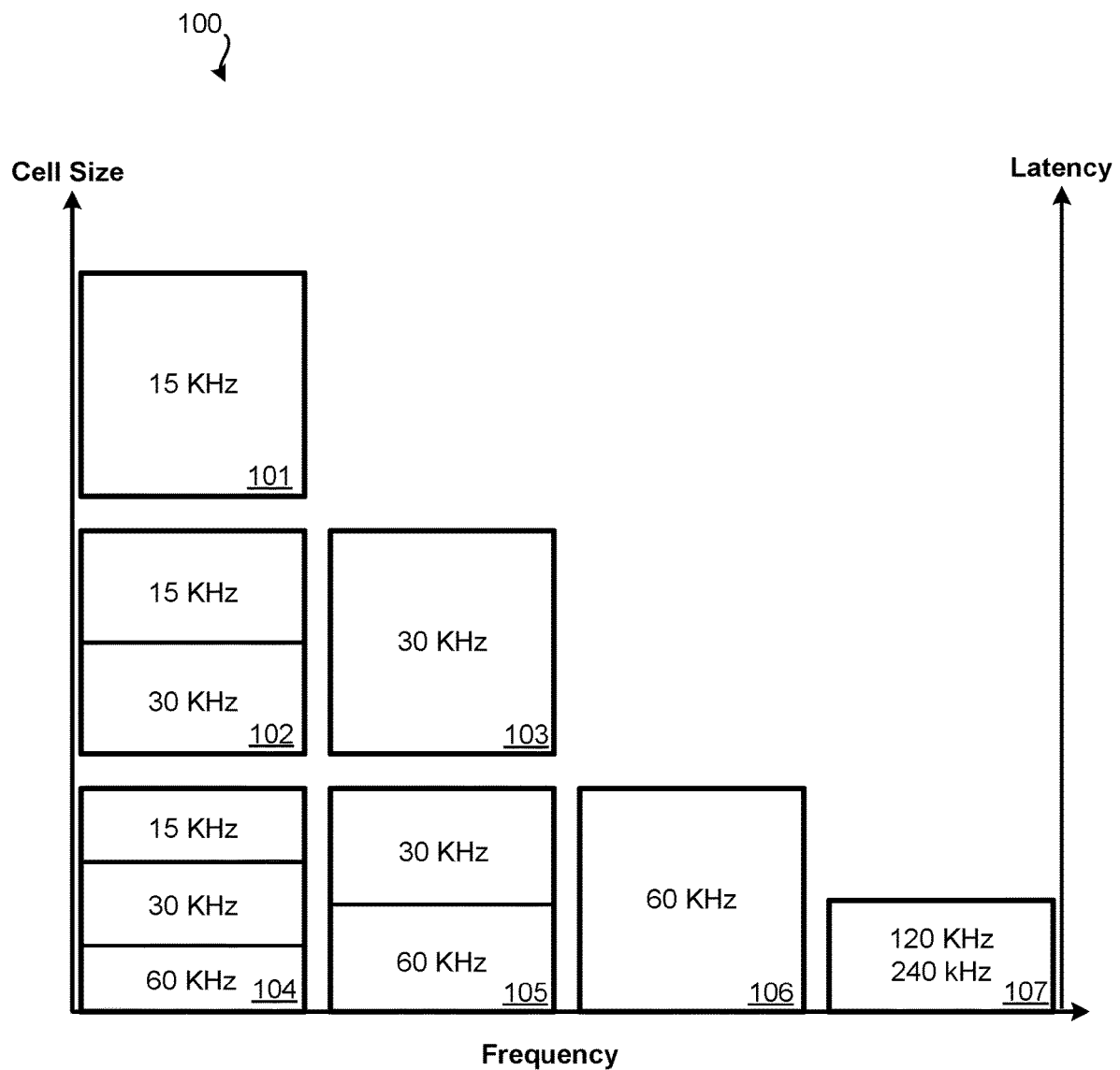
FIG. 1 illustrates an embodiment of how sub-carrier spacing (SCS) may be selected for a cell of a cellular network.

FIG. 1 illustrates an embodiment 100 of how sub-carrier spacings may be selected for a cell of a cellular network. A bandwidth part (BWP) can be understood as a subset of contiguous physical resource blocks on a carrier. A BWP defines the carrier bandwidth for communication with a base station. At any given time, a UE communicates using a single active BWP for uplink communications and a another single active BWP for downlink communications for a given cell. In FIG. 1, in order to achieve greater cell sizes (and thus provide coverage to a larger geographic region), smaller SCS may be used. As a smaller SCS is used, latency may be increased. As shown in block 101, for a large cell size, a BS may employ SCS of 15 KHz. For a medium sized cell, at lower frequencies, a SCS of 15 KHz or 30 KHz can be used, as indicated by block 102. Also, for a medium sized cell, at mid-frequencies, a SCS of 30 KHz can be used, as indicated by block 103. For small cells, blocks 104, 105, 106, and 107 illustrates possible SCS at different frequencies.

Figure 2:
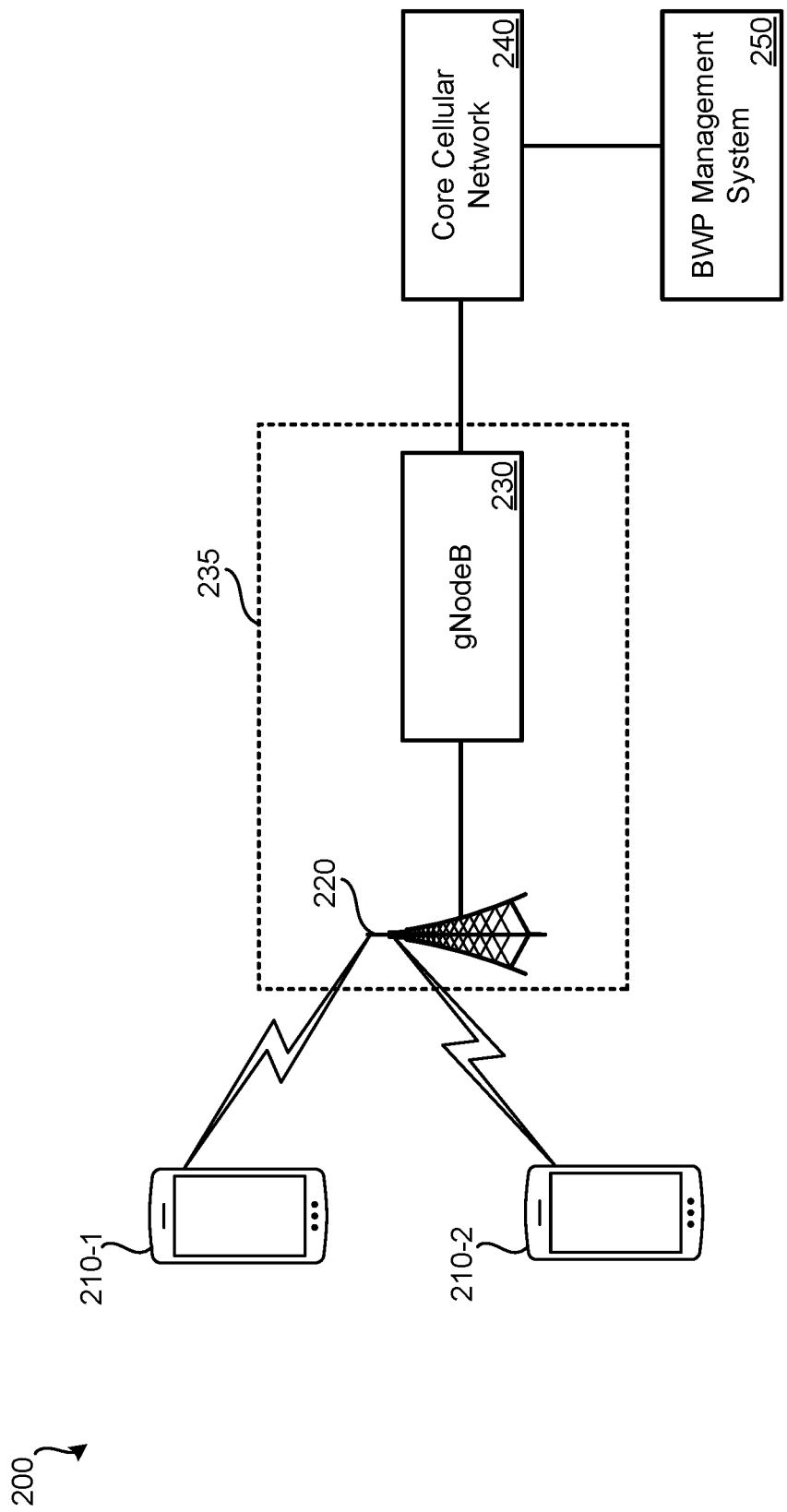
FIG. 2 illustrates an embodiment of a cellular system 200 in which a base station communicates with multiple UEs.

FIG. 2 illustrates an embodiment of a cellular system 200 in which a BS communicates with multiple UEs. Cellular system 200 can include: UE 210; UE 215; BS 235 (which can include BS tower 220 and gNodeB 230); core cellular network 240; and BWP management system 250.

In some embodiments, cellular system 200 represents a 5G New Radio (NR) cellular system. In other embodiments, other forms of radio access technology (RAT) may be used.

UE refers to a wireless computerized device that communicate with BS 235. For instance, pieces of UE can be smart phones, cellular phones, laptop computers, tablet computers, gaming devices, smart home devices, IoT devices, or any other computerized device configured to use the appropriate RAT to communicate with BS 235. UE may also include one or more access points (APs). An access point may provide network access to one or more other devices. For instance, some devices may be able to communicate wirelessly via Wi-Fi. The AP may communicate locally with devices using Wi-Fi and communicate with BS 235 using a different RAT. As illustrated, two UEs, 210 and 215, are presented. It should be understood that BS 235 may communicate with many more UEs concurrently. For instance, hundreds of UEs may be served by BS 235 at a given time.

BS 235 may provide service to a particular cell of a cellular network. BS 235 may include BS tower 220 and gNodeB 230. Specifically, gNodeB 230 may only be present if the cellular network is a 5G NR network. In other embodiments, such as if a 4G network is used, an eNodeB may be present. A gNodeB or eNodeB can represent hardware that is connected to the mobile phone network that communicates directly wirelessly with UE. Antennas may be arranged on BS tower 220.

Core cellular network 240 may be in communication with many base stations. Various processing functions may be provided directly by core cellular network 240, by gNodeB 230, or by a separate system in communication with core cellular network 240 or gNodeB 230. For instance, BWP management system 250 may be separate from and in communication with gNodeB 230. Alternatively, BWP management system 250 may be incorporated as part of core cellular network 240 or gNodeB 230. BWP management system 250 can be part of network management (NM) or system-level Radio Resource Management (RRM).

BWP management system 250 may manage the amount of bandwidth assigned to different BWPs of a given BS at a time. BWP may dynamically alter the BW assigned to each BWP such that different traffic loads on each BWP can be accommodated. BWP management system 250 may include one or more computer server systems.

Figure 3:
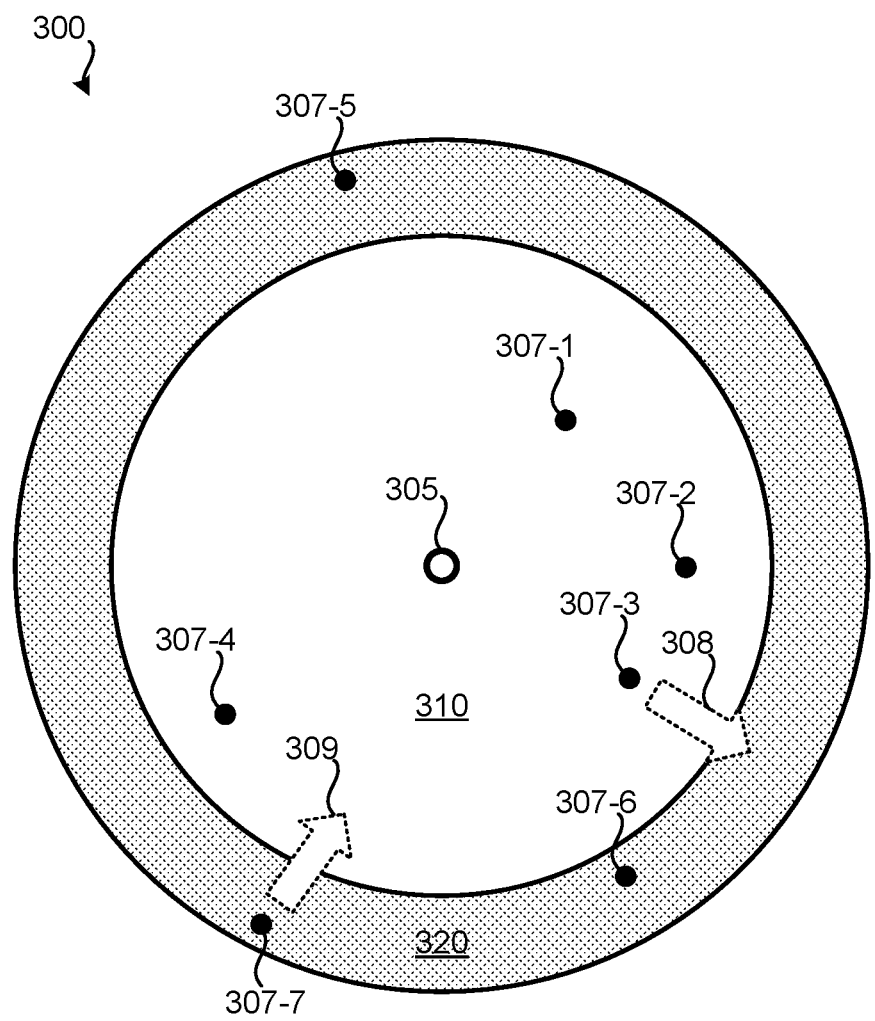
FIG. 3 illustrates an embodiment of a cellular base station using multiple bandwidth parts to communicate with different sets of UE.

FIG. 3 illustrates an embodiment 300 of a cellular BS using multiple bandwidth parts to communicate with different sets of UE. Such an arrangement can improve cell coverage by the BS. In embodiment 300, BS 305 is located near the center of the cell. BS 305 can represent an embodiment of BS 235 of FIG. 2. BS 305 may communicate with UEs using different BWPs. BS 305 may use a first BWP to communicate (uplink or downlink transmissions) with UE that are located relatively close to BS 305. More precisely, signal strength measurements may be used to determine which UEs are relatively close to BS 305.

UEs 311, 312, 313, and 314 are within region 310 in which a relatively strong signal strength is received by each UE from BS 305. For each of these UEs, a first BWP definition may be used. The first BWP definition may define a relatively wide-band BWP. On the first BWP a first SCS may be used. The SCS may be greater, to allow for lower latency, than a second BWP.

UEs 315, 316, and 317 are within region 320 in which a relatively weak signal strength is received by each UE from BS 305. For each of these UEs, a second BWP definition may be used. The second BWP definition may define a relatively narrow BWP (compared to the first BWP). On the second BWP, a second SCS may be used that differs from the first SCS. The SCS may be smaller than used for the first BWP. Such an arrangement may increase latency but may effectively increase the coverage of the cell of BS 305 by allowing for communication with UE experiencing a lower signal strength from BS 305. Therefore, for example, if only a larger SCS was used, UEs 315, 316, and 317 may have been effectively outside of communication range with BS 305. However, by a second BWP being defined that allows for communication using the smaller SCS, UEs 315, 316, and 317 can effectively communicate with BS 305.

Whether the first BWP or the second BWP is used for communication between the BS and a particular UE may be dependent on the signal strength measured by the UE (or by the BS). Particularly, UE 313 may move in direction 308. As UE 313 moves, the signal strength may drop and BS 305 may transition UE 313 from communicating using the first BWP to using the second BWP. In some embodiments, this action is accomplished by transmitting a definition of the second BWP to UE 313. In other embodiments, UE 313 already has stored definitions of both the first and second BWPs; in such embodiments, BS 305 may transmit a message to configure UE 313 to activate the second BWP instead of the first BWP. In some embodiments, the message may include a timer defining when the second BWP should be activated.

Similarly, UE 317 may move in direction 309. As UE 317 moves, the signal strength may increase and BS 305 may transition UE 317 from communicating using the second BWP to using the first BWP. In some embodiments, this action is accomplished by transmitting a definition of the first BWP to UE 317. In other embodiments, UE 317 already has stored definitions of both the first and second BWPs; in such embodiments, BS 305 may transmit a message to configure UE 317 to activate the first BWP instead of the second BWP.

As shown in FIG. 3, both the first and second BWP are being used to communicate with different UEs by BS 305 concurrently. Therefore, while UE 311 is using the first BWP to communicate with BS 305, UE 316 is using the second BWP to communication with BS 305. While the examples of this document are focused on two BWPs being defined and used concurrently by BS 305, it should be understood that greater than two BWPs can be concurrently used by BS 305.

Figure 4A:
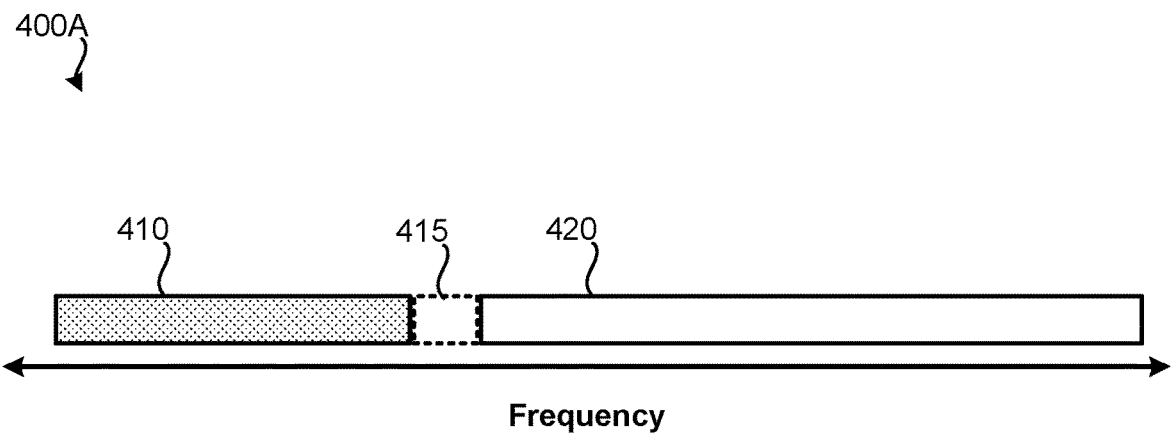
FIGS. 4A and 4B illustrate embodiments of multiple bandwidth parts allocated for use concurrently with a base station.
Figure 4B:
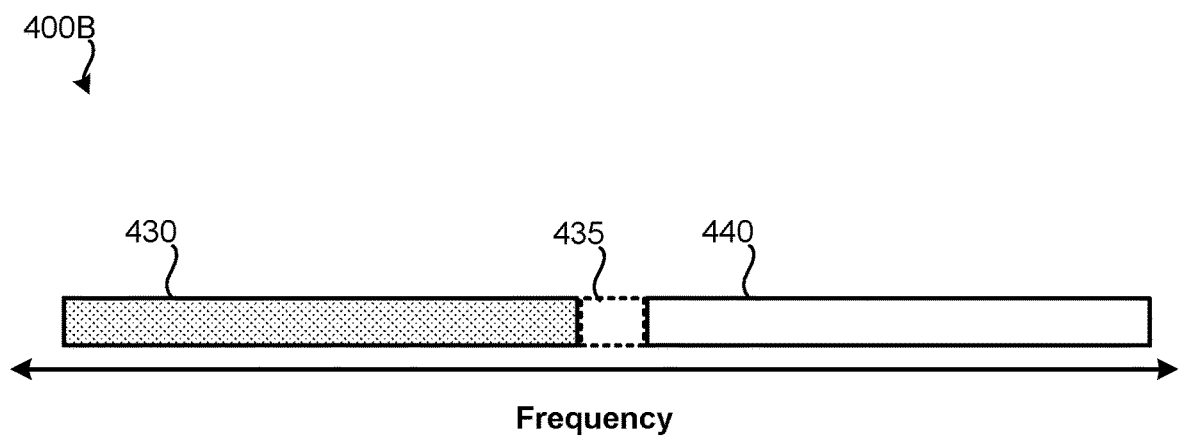

FIGS. 4A and 4B illustrate embodiments of multiple bandwidth parts allocated for use concurrently with a BS. In embodiment 400A of FIG. 4A, two BWPs with a guard band are illustrated. A first bandwidth part 420 has a greater bandwidth than BWP 410. BWP 420 may use a first, wider SCS than BWP 410. For instance, BWP 420 may use a SCS of 30 KHz while BWP 410 uses a SCS of 15 KHz. The relative amount of bandwidth assigned to BWP 420 and BWP 410 may be based on the relative amount of UE traffic using each BWP. Between BWP 420 and BWP 410, a guard band 415 may be present. Guard band 415 may be necessary to avoid inter-numerology interference because of different SCS being used on BWP 420 and BWP 410.

In embodiment 400B of FIG. 4B, again here, two BWPs with a guard band are illustrated. A first bandwidth part 440 has a greater bandwidth than BWP 430. BWP 440 may use a first, wider SCS than BWP 430. As compared to embodiment 400A, the relative amount of bandwidth assigned to BWP 420 and BWP 410 has been adjusted to compensate for a heavy bandwidth usage of BWP 410 occurring. As detailed in relation to guard band 415, between BWP 440 and BWP 430, guard band 435 may be present to avoid inter-numerology interference because of different SCS being used on BWP 440 and BWP 430.

Figure 5:
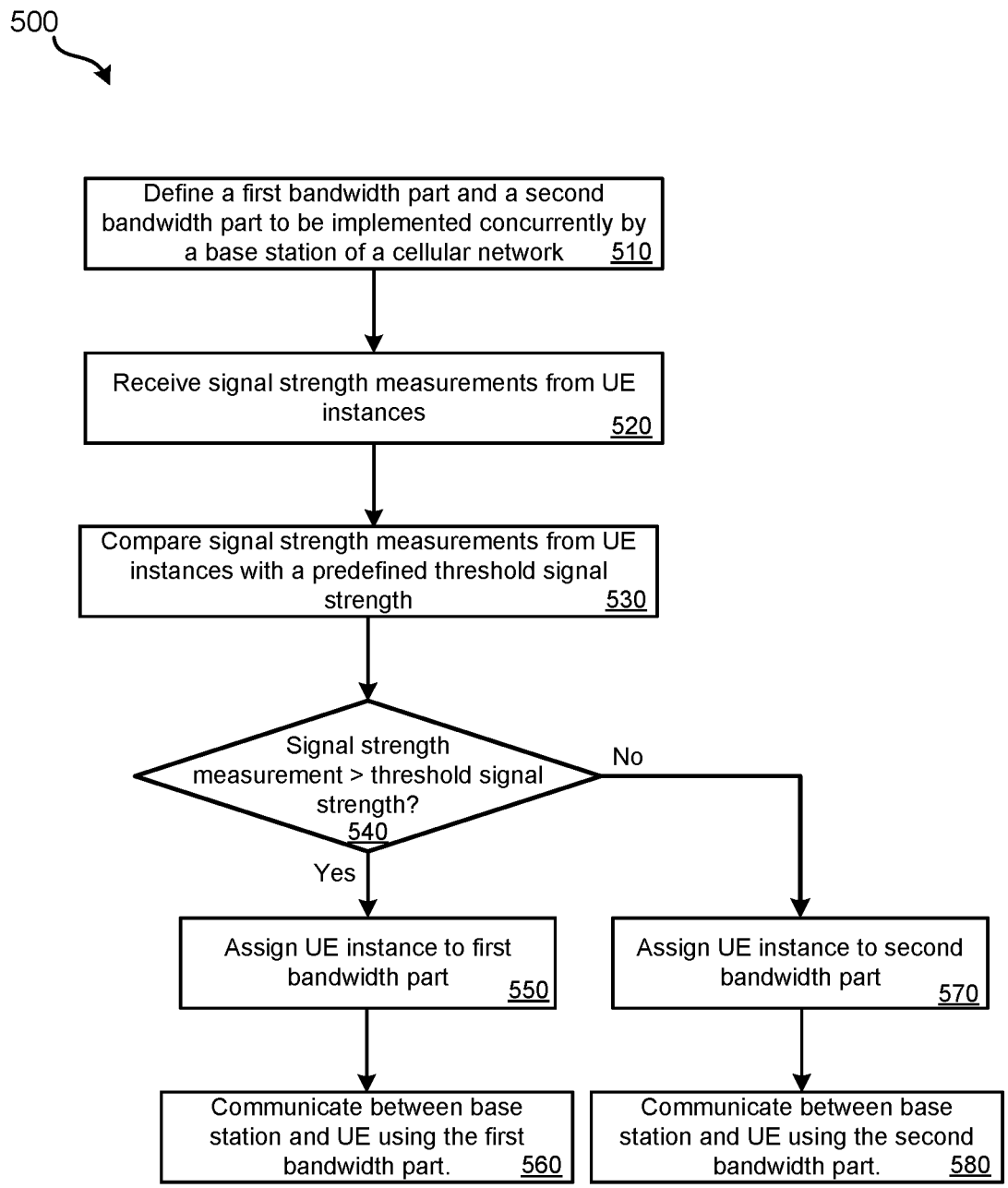
FIG. 5 illustrates an embodiment of a method for improving coverage of a cellular network base station by concurrently using multiple bandwidth parts.

Various methods may be performed using the systems and arrangements detailed in relation to FIGS. 1-3. Specifically, various methods may be performed in order to permit multiple BWPs to be used concurrently by a BS to improve its coverage characteristics. FIG. 5 illustrates an embodiment of a method for improving coverage of a cellular network BS by concurrently using multiple bandwidth parts. Method 500 may be performed using cellular system 200 of FIG. 2. More specifically, blocks of method 500 may be performed using a UE, BS, core cellular network, and/or a BWP management system.

At block 510, a first BWP and a second BWP may be defined and an indication of the BWPs may be provided to the UE. The first BWP and the second BWP do not overlap and both exist within the overall channel bandwidth for use by the cellular network. The first BWP and second BWP may be defined to be used by a BS concurrently—therefore, some UEs will be using the first BWP and other UEs will be using the second BWP. Block 510 may be performed by the base station (e.g., gNodeB), a component of the core cellular network, or by a BWP management system that is in communication with components of the cellular network. The first BWP may have: 1) a greater SCS than the second BWP; and/or 2) greater bandwidth than the second BWP (e.g., similar to embodiment 400A of FIG. 4A). Therefore, the second BWP may have 1) a smaller SCS than the first BWP; and/or 2) greater bandwidth than the first BWP (e.g., similar to embodiment 400A of FIG. 4A).

At block 520, a UE may make a signal strength measurement based on signals received from the base station. The UE may transmit an indication of the measured signal strength to the base station. In other embodiments, the BS may measure the signal strength of one or more signals received from the UE.

At block 530, the signal strength measurement, made either by the UE or by the base station, may be compared with a stored threshold signal strength value. The comparison of block 530 may be performed locally at the UE or, if the signal strength measurements were transmitted to or made by the base station, block 530 may be performed by the base station. In some embodiments, the threshold signal strength may be adjusted to perform load balancing. That is, if a large number of UEs are either greater or less than the threshold, the threshold may be adjusted to achieve a different distribution of UEs being greater or less than the threshold.

For a given UE, at block 540, a determination may be made as to whether the signal strength measurement is greater than the threshold signal strength value. This determination may be made at the UE or at the base station. If greater than the threshold signal strength value, method 500 may proceed to block 550. If less than the threshold signal strength value, method 500 may proceed to block 570.

At block 550, the UE may be assigned to use the first BWP for communication. A message from the BS can include an instruction to the UE to use the first BWP of which it has a stored definition. The first BWP may be used for uplink or downlink communications between the BS and the UE. In some embodiments, a definition of the first BWP is transmitted to the UE that indicates the SCS to be used and the resource blocks available for use as part of the first BWP.

At block 560, communication between the BS and the UE may be performed using the first BWP. The UE may experience lower latency due to a greater SCS being used. Occasionally or periodically, method 500 may return to block 520 to repeat signal strength measurements and reassess whether the UE should be using the first BWP or the second BWP.

At block 570, the UE may be assigned to use the second BWP for communication. This may include a message containing an instruction to switch to using the second BWP being transmitted to the UE by the BS. The downlink channel bandwidth and the uplink channel bandwidth each may be divided into multiple BWPs. This second BWP may be used for uplink or downlink communications, depending on whether the BWP is assigned for uplink or downlink communications. If the second BWP uses less bandwidth than the first BWP, less power may be needed by the UE to communicate using the second BWP than the first BWP. In other embodiments, definitions of the first BWP and the second BWP are provided to the UE, but only one of the BWPs is indicated in a message from the BS to the UE to be activated.

At block 580, communication between the BS and the UE (e.g., uplink communications) may be performed using the second BWP. The UE may experience higher latency due to a smaller SCS being used; however, the UE may experience longer battery life (if the second BWP is smaller in bandwidth than the first BWP). Further, since a smaller SCS is used, the UE may be able to communicate with the BS, whereas if only the first BWP was available, the UE may not be able to successfully communicate with the BS. Occasionally or periodically, method 500 may return to block 520 to repeat signal strength measurements and reassess whether the UE should be using the first BWP or the second BWP.

While some number of UE may be using the first BWP for communication with the BS, other UEs are using the second BWP for communication with the BS. Therefore, the BS is simultaneously using two (or more) BWP definitions for communication with UE.

As detailed in relation to FIGS. 4A and 4B it is possible to use different amounts of bandwidth for different BWPs. For instance, BWP 410 may be determined to have insufficient bandwidth for the volume of data transmissions and/or the number of UEs communicating using BWP 410. Therefore, a base station or some component of core cellular network 240, may determine that the bandwidth of BWP 410 should be increased. To do so, the amount of bandwidth of BWP 420 may need to be decreased and a guard band may need to be maintained between BWP 410 and BWP 420. Since BWP 410 and BWP 420 use different subcarrier spacings, the cellular network must first ensure that all UE use the proper guardband to prevent inter-numerology interference. Further detail regarding how a transition between bandwidth part definitions is provided in relation to FIGS. 6 and 7.

Figure 6:
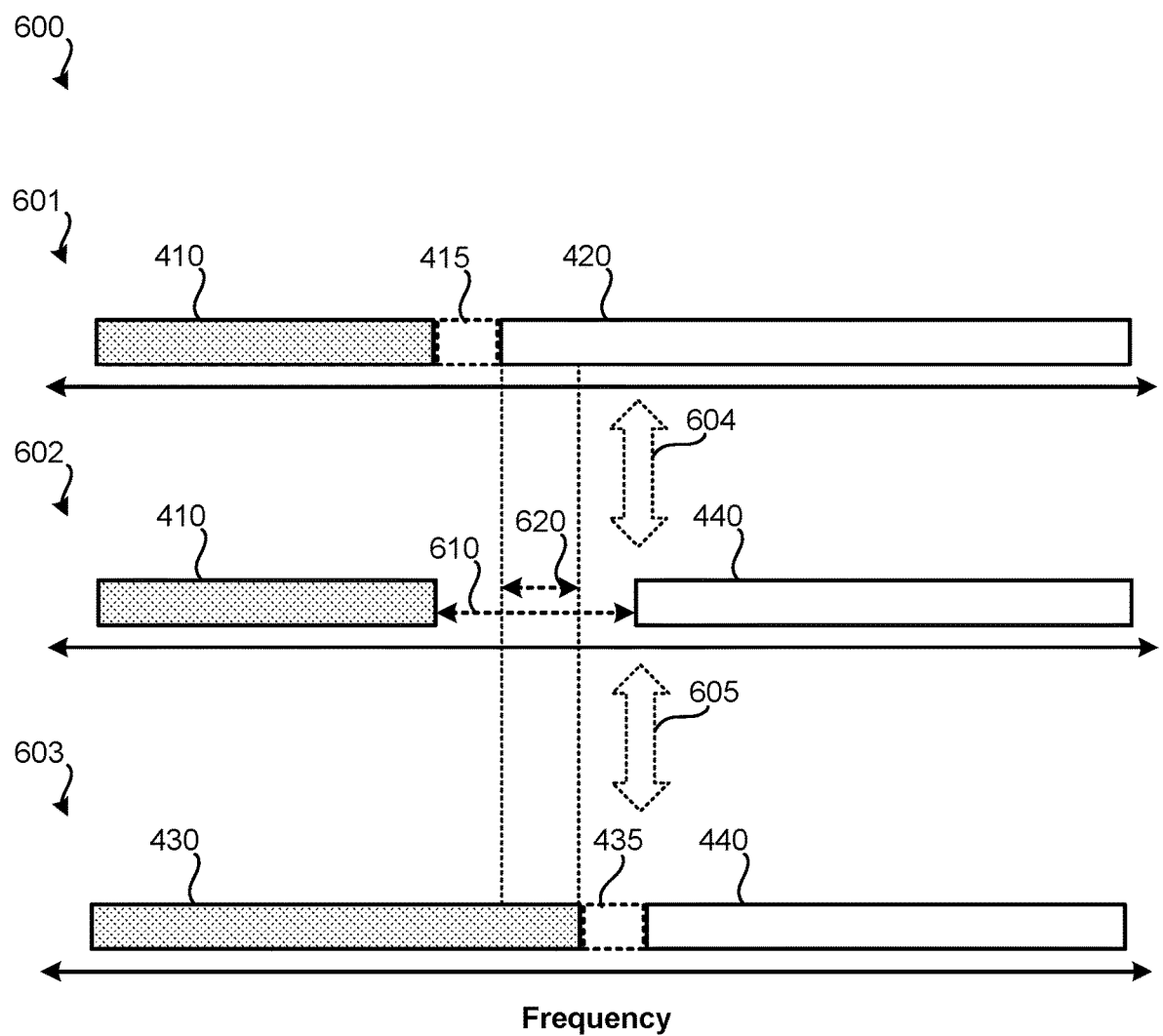
FIG. 6 illustrates an embodiment of a bandwidth adjustment transition performed for a base station and the UE communicating with the base station.

FIG. 6 illustrates an embodiment 600 of a bandwidth adjustment transition performed for a base station and the UE communicating with the base station. The bandwidth adjustment of embodiment 600 can be performed by a base station, such as BS 235. The total amount of bandwidth to allocate may remain unchanged; however, the amount of bandwidth using a particular SCS can be adjusted. In some embodiments, BS 235 may be instructed to perform the transition by core cellular network 240. Initially, two BWPs (BWP 410 and BWP 420) having different SCSs may be used by the base station for communication with UEs. The base station may determine to enlarge BWP 410 to be BWP 430. Therefore, BWP 410 and BWP 430 may have the same subcarrier spacing, but BWP 430 has a greater allocated bandwidth.

In some embodiments, the bandwidth of BWP 430 is predefined. That is, only two predefined options may be possible: BWP 410 or BWP 430. In other embodiments, the bandwidth of BWP 430 may be dynamic in that the base station can customize the amount of bandwidth assigned to be part of BWP 430 depending on factors such as the amount of communication traffic attempting to use the BWP, and/or the number of UE using the BWP.

Initially, as indicated by BWP arrangement 601, a base station may concurrently have two active BWP definitions corresponding to BWP 410 and BWP 420, which can be separated by a guard band. In BWP arrangement 601, which corresponds to embodiment 400A of FIG. 4A, BWP 410 and BWP 420 use different subcarrier spacings and, therefore, guard band 415 between BWP 410 and BWP 420 is needed to prevent inter-numerology interference. As can be seen from FIG. 6, since BWP is to be decreased in bandwidth, a portion of BWP 420 overlaps BWP 430, which has a different SCS. Therefore, to prevent inter-numerology interference, it may be necessary for UEs to not be scheduled to communicate using BWP 420 before UEs start communicating using BWP 430.

A first transition from BWP arrangement 601 to BWP arrangement 602 may be performed. As part of the first transition, UEs may receive an instruction to communicate using BWP 440 instead of BWP 420. In some embodiments, UE can be assigned four definitions of BWPs. Therefore, a message may be received that deactivates a definition corresponding to BWP 420 and activates a BWP corresponding to BWP 440. In other embodiments, a new definition of BWP 440 is transmitted to UE that deactivates or replaces the definition corresponding to BWP 420. In some embodiments, the message to use BWP 440 is provided to all UE communicating with the BS. Therefore, if a UE is communicating using BWP 410, the UE may be unaffected by the change relating to BWP 420.

A period of time may elapse to ensure that communication between all UE and the base station occur on BWP 410 and BWP 440 as indicated in BWP arrangement 602. Therefore, when BWP arrangement 602 is active, a temporary adequate guard band 610 is present.

A second transition from BWP arrangement 602 to BWP arrangement 603 may be performed. As part of the second transition, UEs may receive an instruction to communicate using BWP 430 instead of BWP 410. In some embodiments, UE can be assigned and store up to four definitions of BWPs. Therefore, a message (or group of messages) may be received that deactivates a definition corresponding to BWP 410 and activates a definition corresponding to BWP 430. In other embodiments, a new definition of BWP 430 is transmitted to UE that deactivates or replaces the definition corresponding to BWP 410. The message to use BWP 430 is provided to all UE communicating with the BS. Therefore, if a UE is communicating using BWP 440, the UE may be (at least initially) unaffected by the change relating to BWP 430.

Once the transition to BWP arrangement 603 is complete, the transition process may be complete. The example of BWP arrangement 603 corresponds to embodiment 400B of FIG. 4B. As detailed in relation to FIG. 4B, BWP 430 and BWP 440 operate using different SCS. The required guard band 435 will be maintained to prevent interference among BWPs 430 and 440 due to the different SCSs.

As indicated by transition arrow 604 and transition arrow 605, the transitions are bidirectional. Therefore, BWP arrangement 603 can be transitioned to BWP arrangement 602, which, in turn, can be transitioned to BWP arrangement 601. Such transitions can be used to increase the bandwidth of BWP 440 and decrease the bandwidth of BWP 430 (such as in response to increased communication traffic on BWP 440 or decreased communication traffic on BWP 430).

Figure 7:
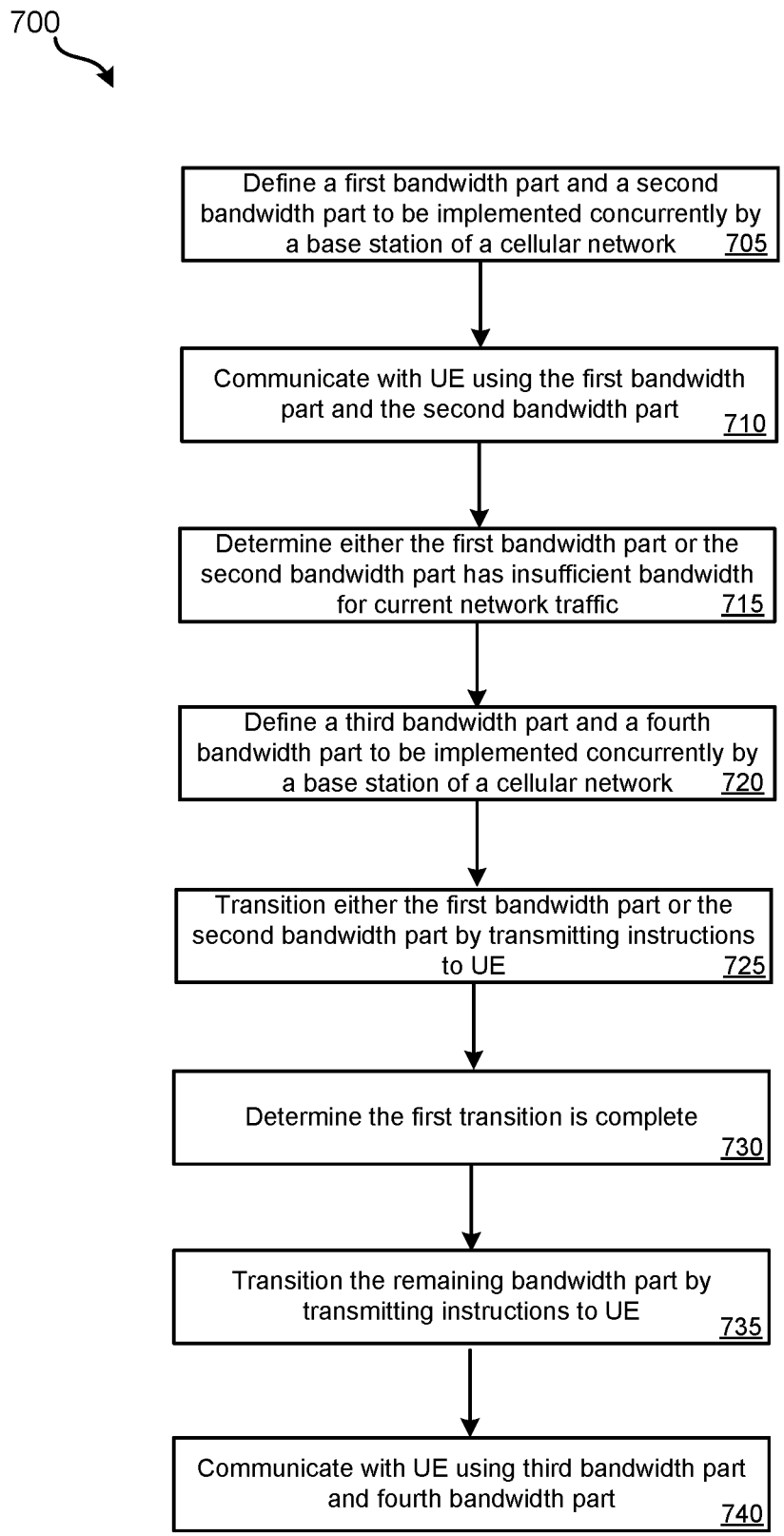
FIG. 7 illustrates an embodiment of a method for transitioning a bandwidth allocation of a base station.

FIG. 7 illustrates an embodiment of a method 700 for transitioning a bandwidth allocation of a base station as detailed in relation to FIG. 6. Method 700 may be performed using cellular system 200 of FIG. 2. More specifically, blocks of method 700 may be performed using a UE, BS, core cellular network, and/or a BWP management system.

At block 705, a first BWP and a second BWP (or more BWPs) may be defined by a BS or a core cellular network in communication with the BS. The definitions of the first BWP and the second BWP may indicate the portions of bandwidth allocated to each BWP. Defining the first BWP and the second BWP can include transmitting definitions of the first BWP and the second BWP to UEs communicating with the BS. Therefore, each UE may receive two (or more) BWP definitions. At a given time, only a single BWP definition may be active (such as detailed in relation to method 500).

At block 710, for some period of time (e.g., seconds, minutes, hours, days, weeks), the BS may communicate with UE using the first BWP and the second BWP having different SCSs. For example, referring to FIG. 2, UE may communicate with the BS using different BWPs having different SCSs in order to increase power efficiency, range, and/or data throughput.

At block 715, the base station or a component of the core cellular network may determine that either the first BWP or the second BWP has insufficient bandwidth for current communication conditions. For instance, a large number of UE may be communicating using a particular BWP or a large amount of data may be transmitted to the BS via the particular BWP. The determination may be made by the BS or a component of the core cellular network comparing a total number of UE using a particular BWP and comparing to a stored threshold value. The determination may be made by the BS or a component of the core cellular network based on comparing an amount of data received on a particular BWP to a stored threshold value. In some embodiments, in addition to or in alternate to the number of UE using a particular BWP, or the amount of data being transmitted on a particular BWP being above a threshold, the determination may be based on the other BWP being underused (e.g., data throughput below a stored threshold, and/or the number of UE using the underutilized BWP being below a stored threshold value).

At block 720, a third BWP and a fourth BWP may be defined by the BS or a core cellular network in communication with the BS. The definitions of the third BWP and the fourth BWP may indicate the portions of bandwidth allocated to each BWP. The third and fourth BWP definitions represent a change from the allocations of the first BWP and the second BWP. For the purposes of this example, the first and third BWPs have a same first SCS and the second and fourth BWPs have a same second SCS that differs from the first SCS. The bandwidth of the first BWP may be increased by transitioning to the third BWP definition (thus increasing the amount of bandwidth). Therefore, the second BWP may be transitioned to the fourth BWP, thus decreasing the amount of bandwidth using the required SCS.

Defining the third BWP and the fourth BWP can include transmitting definitions of the third BWP and the fourth BWP to UEs communicating with the BS. Therefore, each UE may receive two additional BWP definitions. In some embodiments, blocks 705 and 720 may be performed together. That is, each UE may receive four BWP definitions as part of a single message or group of messages. At a given time, a UE may have a single active BWP from selected from a group that are permitted to be active. At any particular time, the UE can only be using a single BWP definition for communication. In other embodiments, the third and fourth BWP definitions may be provided at a later time. In such embodiments, it may be possible to customize the amount of bandwidth assigned to each BWP based on the amount of network traffic.

At block 725, whichever of the first BWP or the second BWP that is being transitioned to less bandwidth may be transitioned. Such a transition may be similar to the transition indicated in FIG. 6 from BWP arrangement 601 to BWP arrangement 602. For example, referring to FIG. 6, the first transition can include transitioning UE from communicating using BWP 420 to BWP 440. Performing the transition can include either: an instruction being transmitted to UE by the BS that indicates a BWP definition that is to be used. All UE communicating with the BS may receive the instruction to transition, but only UE currently using the particular BWP being transitioned may be affected.

At block 735, the BWP that is to be enlarged in bandwidth may be adjusted by the new BWP definition being used by each UE. For example, referring to FIG. 6, and the transition from BWP arrangement 602 to BWP arrangement 603, each UE may use BWP 430. Referring to the example of FIG. 6, following this second transition, BWP 430 may use a portion of bandwidth previously used by BWP 420.

At block 740, for some period of time (e.g., seconds, minutes, hours, days, weeks), the BS may communicate with UEs using the third BWP and the fourth BWP having different SCSs. Such communicate may occur such that different UE use different BWPs (having different SCSs) communicate with the BS simultaneously. At some point in the future, another set of transitions may be performed in order to reallocate bandwidth due to changing needs of the cellular network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for cellular network communication, comprising:
    defining a first bandwidth part and a second bandwidth part to be implemented concurrently by a base station of a cellular network;
    assigning a first set of user equipment to use the first bandwidth part for communication with the base station based on comparing a signal strength of each piece of user equipment of the first set of user equipment with a signal strength threshold;
    assigning a second set of user equipment, distinct from the first set of user equipment, to use the second bandwidth part for communication with the base station based on comparing a signal strength of each piece of user equipment with the signal strength threshold; and
    performing communication between the base station and the first set of user equipment using the first bandwidth part and performing communication between the base station and the second set of user equipment using the second bandwidth part.

2. The method for cellular network communication of claim 1, wherein the first bandwidth part and the second bandwidth part do not overlap and are separated by a guard band.

3. The method for cellular network communication of claim 1, wherein the first bandwidth part has a greater bandwidth than the second bandwidth part.

4. The method for cellular network communication of claim 1, wherein the first bandwidth part uses a first subcarrier spacing (SCS) that is greater than a second SCS of the second bandwidth part.

5. The method for cellular network communication of claim 4, wherein:
    performing communication between the base station and the first set of user equipment using the first bandwidth part uses the first SCS; and
    performing communication between the base station and the second set of user equipment using the second bandwidth part uses the second SCS.

6. The method for cellular network communication of claim 1, further comprising:
    measuring, by a piece of user equipment of the first set of user equipment, a signal strength of a signal received from the base station; and
    providing, by the piece of user equipment of the first set of user equipment, an indication of the signal strength to the base station.

7. The method for cellular network communication of claim 1, wherein the cellular network uses 5G New Radio (NR) radio access technology (RAT).

8. The method for cellular network communication of claim 1, further comprising:
    monitoring, by the cellular network, bandwidth usage within the first bandwidth part and the second bandwidth part; and
    reallocating, by the cellular network, bandwidth between the first bandwidth part and the second bandwidth part based on the monitored bandwidth usage.

9. The method for cellular network communication of claim 1, wherein the first set of user equipment communicating with the base station using the first bandwidth part experiences lower latency than the second set of user equipment communicating with the base station using the second bandwidth part.

10. The method for cellular network communication of claim 1, wherein the second bandwidth part provides coverage over a greater geographical area than the first bandwidth part.

11. A cellular communication system, the cellular communication system comprising:
a base station, functioning as part of a cellular network, that communicates with a plurality of user equipment, wherein the cellular network is configured to:
define a first bandwidth part and a second bandwidth part to be implemented concurrently using the base station;
assign a first set of user equipment to use the first bandwidth part for communication with the base station based on comparing a signal strength of each piece of user equipment of the first set of user equipment with a signal strength threshold;
assign a second set of user equipment, distinct from the first set of user equipment, to use the second bandwidth part for communication with the base station based on comparing a signal strength of each piece of user equipment with the signal strength threshold; and
perform communication between the base station and the first set of user equipment using the first bandwidth part and performing communication between the base station and the second set of user equipment using the second bandwidth part.

12. The cellular communication system of claim 11, wherein the first bandwidth part and the second bandwidth part do not overlap and are separated by a guard band.

13. The cellular communication system of claim 11, wherein the first bandwidth part has a greater bandwidth than the second bandwidth part.

14. The cellular communication system of claim 11, wherein the first bandwidth part uses a first subcarrier spacing (SCS) that is greater than a second SCS of the second bandwidth part.

15. The cellular communication system of claim 14, wherein:
the cellular network performing communication between the base station and the first set of user equipment using the first bandwidth part comprises using the first SCS; and
the cellular network performing communication between the base station and the second set of user equipment using the second bandwidth part comprises using the second SCS.

16. The cellular communication system of claim 11, further comprising the plurality of user equipment, wherein a piece of user equipment of the plurality of user equipment is configured to:
measure a signal strength of a signal received from the base station; and
provide an indication of the signal strength to the base station.

17. The cellular communication system of claim 11, wherein the cellular network uses 5G New Radio (NR) radio access technology (RAT) and the base station is a gNodeB (gNB).

18. The cellular communication system of claim 11, wherein the cellular network is further configured to:
monitor bandwidth usage within the first bandwidth part and the second bandwidth part; and
reallocate bandwidth between the first bandwidth part and the second bandwidth part based on the monitored bandwidth usage.

19. The cellular communication system of claim 11, wherein the second bandwidth part provides coverage over a greater geographical area than the first bandwidth part.

20. A 5G cellular communication system, the 5G cellular communication system comprising:
a plurality of user equipment configured to perform signal strength measurements and transmit indications of signal strength to a gNodeB; and
the gNodeB, functioning as part of a cellular network, that communicates with the plurality of user equipment, wherein the gNodeB is configured to:
define a first bandwidth part and a second bandwidth part to be implemented concurrently;
assign a first set of user equipment to use the first bandwidth part for communication with the gNodeB based on comparing a signal strength of each piece of user equipment of the first set of user equipment with a signal strength threshold;
assign a second set of user equipment, distinct from the first set of user equipment, to use the second bandwidth part for communication with the gNodeB based on comparing a signal strength of each piece of user equipment with the signal strength threshold; and
perform communication between the gNodeB and the first set of user equipment using the first bandwidth part and performing communication between the gNodeB and the second set of user equipment using the second bandwidth part.

\* \* \* \* \*